United States Patent [19]
VanDenberg

[11] Patent Number: 4,991,868
[45] Date of Patent: Feb. 12, 1991

[54] VEHICLE SUSPENSION BEAM PIVOT CONNECTION
[75] Inventor: Ervin K. VanDenberg, North Canton, Ohio
[73] Assignee: The Boler Company, Itasca, Ill.
[21] Appl. No.: 452,631
[22] Filed: Dec. 19, 1989
[51] Int. Cl.$^5$ ............................................. B60G 11/28
[52] U.S. Cl. ..................................... 280/711; 280/688
[58] Field of Search ............... 280/688, 702, 683, 711, 280/724, 725, 713; 267/256

[56] References Cited
U.S. PATENT DOCUMENTS

| Re. 30,308 | 6/1980 | Masser | 280/713 |
|---|---|---|---|
| 1,242,495 | 10/1917 | Thomas | 267/27 |
| 3,510,149 | 5/1970 | Raidel | 280/124 |
| 3,960,388 | 1/1976 | Strader et al. | 280/693 |
| 4,162,090 | 7/1979 | Schwartz | 280/688 |
| 4,166,640 | 9/1979 | VanDenberg | 280/711 |
| 4,427,213 | 1/1984 | Raidel | 280/711 |
| 4,762,337 | 8/1988 | Raidel | 280/711 |
| 4,773,670 | 9/1988 | Raidel, II | 280/685 |

OTHER PUBLICATIONS

VanDenberg, Ervin K. Print of design sold to Dakota Trailer more than one year prior to the filing of this application (Approximate date—1985).
Hendrickson Turner, Trailer Air Suspension T-15-155, Information Sheet S-4895. Dec. 1987.

Primary Examiner—Richard A. Bertsch
Attorney, Agent, or Firm—Shlesinger & Myers

[57] ABSTRACT

An axle aligning connector particularly applicable to an axle-type suspension system having a substantially rigid beam and an elastomeric bushing structure located at or near the pivot connection between the hanger bracket and the beam, features an inner tube that extends transversely across the entire beam and through and beyond inner and outer plates located near opposed sides of the beam to connect without the use of threaded fasteners and allows rebushing without removing the inner plate.

3 Claims, 2 Drawing Sheets

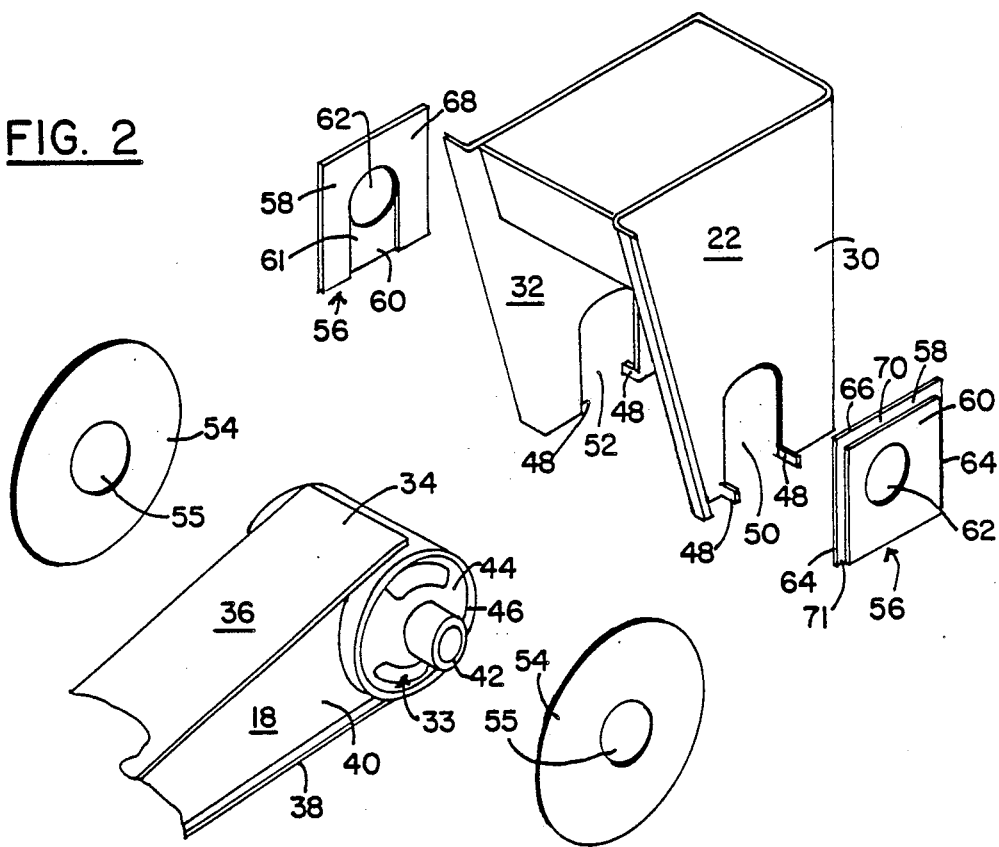
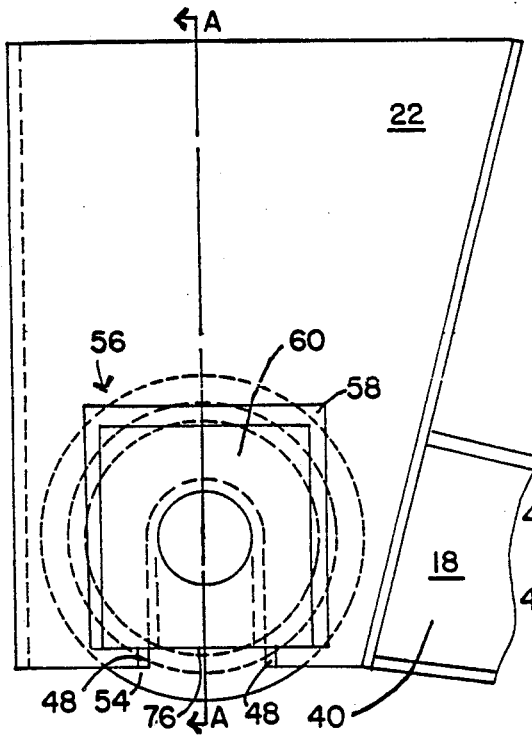
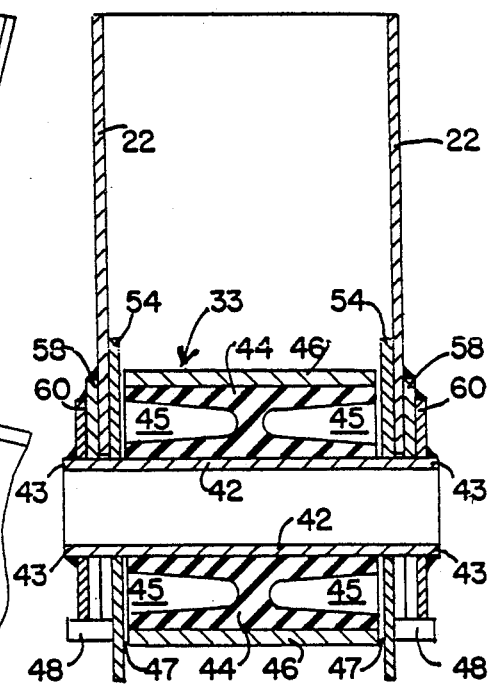

VEHICLE SUSPENSION BEAM PIVOT CONNECTION

BACKGROUND OF THE INVENTION

This invention relates to axle suspension systems of the type that have beam assemblies, pivotally connected to opposite sides of a vehicle frame, so that they move about a given point. An axle which carries ground-engaging wheels is secured to the beam assemblies, and an air bag or similar system is disposed in load-transmitting relation between the assemblies and the frame at the end of the beam opposite the pivot connection. More particularly, this invention relates to certain unique pivotal connections between the beam assembly and the vehicle frame, that also serve to keep axles properly aligned, with respect to the longitudinal axis of the vehicle.

It is known, in beam type suspension systems, to make use of a system including turnbuckles, adjusting screws, eccentric pins or similar devices, to initially align and subsequently adjust the alignment of the axle relative to the frame, as well as maintain a pivotal connection between the beam and the vehicle frame. In each of these cases, some type of bolt, clamp or equivalent device has been used to lock the pivot connection between a beam assembly and frame bracket in a stationary position. As a result, the axle, which is connected to the beam assembly, is also locked in a stationary position relative to the longitudinal axis of the beam assembly, once it is determined that the axle is in proper alignment relative to the frame. Conventionally, the pivot connection locking device has been entirely or partially comprised of manually releasable threaded elements, to facilitate adjustment of the axle alignment, as may be required from time to time during the life of the vehicle.

Exemplary of the prior art vehicle suspension beam pivot connections are U.S. Pat. Nos. 3,960,388 to Strader, Masser and Lundwall, Re 30,308 to Masser, and U.S. Pat. No. 4,166,640 to VanDenberg. The Masser patents disclose a vehicle beam suspension system, having a pivotal connection between the control arm and the frame, wherein the frame bracket has a slotted aperture substantially longer than the diameter of a connecting bolt that passes through them, in order to provide fore and aft adjustment of the control arm and, therefore, alignment of the axle connected to it. The connecting bolt is used to initially fix the alignment of the axle by tensioning the mounting plates against the frame brackets at a desired position. The mounting plates are then welded to the frame brackets, to further fix the alignment of the suspension system relative to the vehicle frame. The axle alignment can subsequently be adjusted by loosening the bolt and breaking the weld. U.S. Pat. No. 4,166,640 to VanDenberg discloses a pivot connection structure that connects a vehicle suspension beam assembly to a vehicle frame. This pivot connection structure uses a bolt to maintain the connection, and also requires rigid metal-to-metal contact between the pin of the connection and the hanger bracket.

While the alignment technique of U.S. Pat. No. 4,166,640 has proven highly advantageous, it and the other techniques have the disadvantage of usually requiring a manually releasable locking means, such as a bolt, which the vehicle operator must torque to as high as about 800 ft. lbs.), once the axle is properly aligned, in order to secure the beam to the vehicle frame. Such torques are not always conveniently achievable by the operator. In addition, the existence of a manually releasable locking means is an undesirable invitation, to an operator or someone maintaining the vehicle, to continually adjust the alignment of the axle using the beam pivot connection.

Known beam pivot/axle alignment connections have also generally required extra parts, such as bushings and heavy bolts, to resist sheer forces generated by such systems. These additional parts add weight and cost to the suspension system and, therefore, reduce the maximum permissible load that can be carried in jurisdictions where that weight is limited. Many prior art connections have also depended largely upon metal-to-metal contact in the area of the connection. Due to the rigid, or quasi-rigid, connection between the axle and the beam assemblies of some of these systems, many of the articulation forces encountered by the vehicle wheels are translated along the beam to the beam pivot connection. These forces can cause a subsequent wearing of the metal parts in contact with one another and, perhaps more importantly, potentially loosen the manually releasable locking means.

It is known to try to take up the deflections in suspensions caused by articulation forces during operation, by providing a resilient bushing construction that is integral with the beam, such as that which is taught in VanDenberg U.S. Pat. No. 4,166,640. The unique resilient bushing construction taught in that patent has met with tremendous commercial success, due in large measure to the longevity of the bushing. Removal of the bushing construction may be necessary to service the axle or brakes of the vehicle. Also, while the resilient bushing construction of this patent is extraordinarily long-lived, it may, during the life of the vehicle, need to be replaced, or if another resilient bushing construction is used, the bushing may require more frequent replacement. Known hanger bracket constructions have closed slots in their side walls. Existing hanger bracket constructions, therefore, do not facilitate rebushing of a beam having an integral bushing construction, where one of the components of the bushing is longer than the width of hanger bracket, so the ends of the bushing extend beyond the side walls of the bracket. Furthermore, existing beam pivot/axle alignment connections do not allow for replacement of the resilient bushing in the beam assembly, while still insuring proper axle alignment after rebushing of the beam has been completed.

OBJECTS OF THE INVENTION

It is, therefore, an object of the present invention to provide a simple, inexpensive suspension structure and beam pivot connection that eliminates all fasteners that require a torquing operating to lock the connection and axle alignment.

Another object of the invention is to provide a suspension structure and beam pivot connection that eliminates all threaded manually releasable fasteners, and serves to initially align and subsequently adjust the alignment of the vehicle axle relative to the vehicle frame.

Yet another object of the invention is to provide these features in an inexpensive and lightweight structure.

Still another object of the present invention is to provide a suspension structure and beam pivot connection that provides a rigid connection between the beam assembly and the hanger bracket that also isolates the beam from the hanger.

A further object of the invention is to provide a beam pivot connection that includes an integral resilient bushing beam construction that allows the bushing to be replaced and avoids beam misalignment.

Still another object of the present invention is to provide a unique two-component alignment plate assembly construction that has first sacrificial component that provides a non-manually threaded connection between that beam and the hanger bracket, and a second component that insures proper alignment after rebushing of a resilient bushing type beam.

These and other objects are satisfied by an axle aligning connector having a first member with an elongated open-ended slot therein, and a second member, integral with and rigidly connected to one surface of the first member, the second member being of smaller size than the first member, and having a central aperture aligned with the slot of the first member, the aperture having a diameter equal to the cross-dimension of the slot. In this way, an adjustable axle aligning beam pivot connection, that facilitates rebushing of the beam and subsequent axle alignment, is provided that does not require torquing of any manually releasable fasteners or a direct rigid connection between the beam assembly and the hanger bracket.

BRIEF DESCRIPTION OF THE DRAWINGS

FIG. 2 is an exploded view of the component parts of the present invention.

FIG. 3 is a side, partially sectionalized X-ray view of an embodiment of the present invention.

FIG. 4 is a cross-sectional front view taken along the sectional line A—A in FIG. 3.

DETAILED DESCRIPTION OF THE INVENTION

Figure 1:
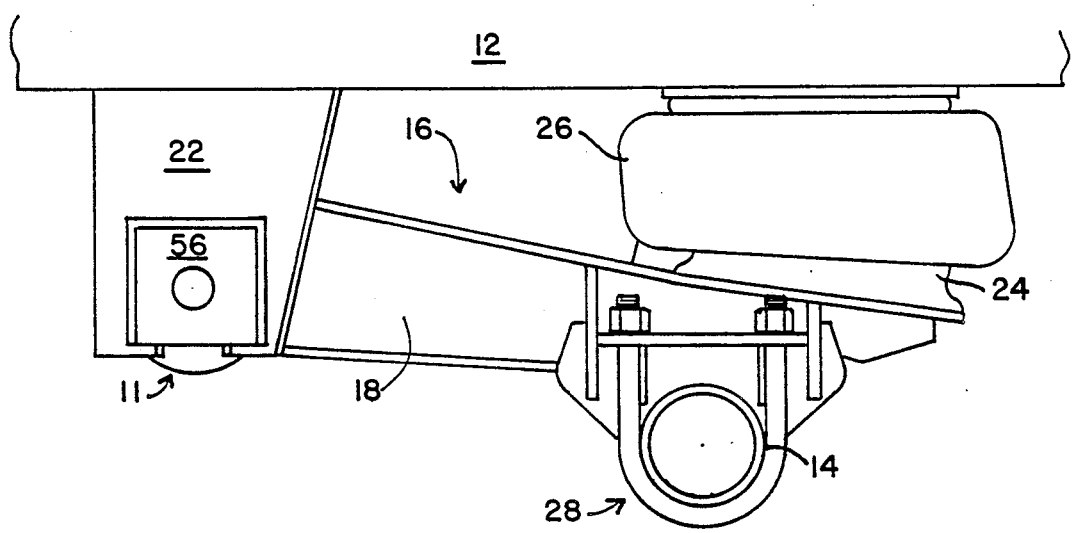
FIG. 1 is a side, partially sectionalized, plan view of a vehicle suspension system containing of the present invention.

With reference first to FIG. 1, there is illustrated an advantageous environment for use of the concepts of this invention. Vehicle (not shown) has frame 12 from which axle 14, which extends in conventional fashion laterally across the vehicle at right angles to longitudinally extending beam assembly 18, is connected to ground engaging wheels (not shown) and is suspended by suspension 16 embodying the present invention. FIG. 1 shows one side of the suspension. The illustrated suspension is duplicated on the other side of the vehicle (not shown). In general, the suspension system 16 includes at each side of the vehicle frame, beam assembly 18 pivotally connected at one end to frame 12 of the vehicle by hanger bracket 22, and having pedestal 24 rigidly connected at its other end to air bag assembly 26, or similar device, that is disposed between pedestal 24 and frame 12. Beam assemblies 18 move about their pivotal connections which are substantially coaxial. Beam assembly 18 is connected by welding or manually releasable fasteners, or a combination thereof, through any conventional axle connecting assembly, shown generally at 28, which houses and secures axle 14. While axle 14 is illustrated as mounted below beam assembly 18, it is understood that the axle can also be mounted above beam assembly 18. In certain preferred embodiments, this axle connecting assembly 28 may be one of the known rigid axle-to-beam connections, such as disclosed in U.S. Pat. No. 4,566,719 to VanDenberg.

Looking now at FIG. 1 in conjunction with FIG. 2, bracket 22, which connects frame 12 to beam 18, has two laterally spaced side portions 30 and 32. Side portions 30 and 32 are provided with aligned apertures 50 and 52, respectively, which elongate in a direction toward the bottom of bracket 22, and are open at their bottoms. Apertures 50 and 52 are required to be open at their bottoms, since beam assemblies 18 they are to accommodate are prebushed and contain inner tube 42 that is wider than the space between side portions 30 and 32. Apertures 50 and 52 are wider than diameter of inner tube 42, to allow adequate movement of tube 42 along longitudinal axis of frame 12, and thereby adjust alignment of axle 14 connected to beam assembly 18. Stops 48 are integral with side portions 30 and 32, and project longitudinally outward from the bottom of side portions 30 and 32 in an area adjacent apertures 50 and 52. When pivot connection, referred to generally as 11, is assembled, end portion 34 of beam assembly 18 containing resilient bushing 33, is disposed between apertures 50 and 52 of side portions 30 and 32.

Beam assembly 18 may assume many shapes and forms known in the art. In the illustrated embodiment, beam 18 is of a substantially rectangular construction composed of top plate 36, bottom plate 38 and side plates 40. End portion 34 of beam assembly 18 has resilient bushing 33 which is integral with beam assembly 18 and is comprised of outer shell 46, elastomeric device 44, and inner tube 42. Outer shell 46 is integral with and constructed of the same material as the beam, such as metal or iron. Inner tube 42 is disposed longitudinally across the entire width of beam assembly 18 within shell 46, and its ends 43 further extend a distance outwardly away from beam assembly 18 beyond side plates 40, as well as beyond side plates 30 and 32. Inner tube 42 is of a hollow rigid construction of metal or similar material. Inner tube 42 is positionally stabilized in substantially the center of shell 46 by resilient elastomeric device 44, which is disposed between shell 46 and tube 42 in concentric relation. Elastomeric device 44 is constructed of natural rubber, or a similar elastomeric compound, that has a high degree of resistance to climatic conditions and exhibits resilient properties. Elastomeric device 44 is provided with cavities 45, which give markedly different deflections beam-wise than hanger-wise and spring rates in the horizontal vs. vertical directions. All pivotal or non-sliding rotational movement about inner tube 42 is designed to be taken up within elastomeric device 44 of bushing 33.

A preferred integral resilient bushing construction, to be used in conjunction with the present invention, is substantially the same as the unique bushing construction taught in U.S. Pat. No. 4,166,640 to VanDenberg. An example of such a bushing is currently produced for Hendrickson Turner Corp. by Goodyear Tire & Rubber Co. and sold by Hendrickson Turner Corp. as its "trifunctional" bushing. The bushing structure of the present invention differs slightly in that inner tube 42 is utilized with ends 43 that extend outwardly beyond laterally spaced sides 30 and 32 of bracket 22, and the need for a pin connector and manually releasable fastener have been eliminated.

Continuing our discussion of the component parts of beam pivot connection 11, with reference to FIG. 2, washers 54 are provided that each have central opening 55 of sufficient diameter to allow inner tube 42 of beam assembly 18 to pass therethrough. Washers 54 are disposed between the inner faces of side portions 30 and 32, respectively, of bracket 22 and end portion 34 of beam assembly 18, when beam pivot connection is assembled (FIG. 4). Alignment plate assembly 56 has a generally stepped construction, featuring alignment plate 58 that has side edge portions 64 extending in a generally vertical direction, and top and bottom edge portions 66 and 71, respectively, which extend generally horizontally between side edge portions 64, forming the first step of the structure. Each plate 58 has slot 61, which runs from substantially the center of plate 58 and elongates in a direction toward bottom edge 71 of plate 58 and is open at its bottom. Alignment plate 58 is required to have an open-ended slot 61, rather than an entirely enclosed slot, since, as described later in detail, it must allow inner tube 42, of integral bushing 33 of beam 18, to pass through during initial installation and rebushing of beam 18. Inner surface 68 of plate 58 abuts against outer surface of bracket 22 when pivot connection 11 is assembled. As can best be seen in FIG. 3, slot 61 in plate 58 is of the same shape and type of construction as apertures 50 and 52 of bracket 22, except that width of slot 61 is slightly narrower than apertures 50 and 52. Integral support plate 60 is of a rectangular configuration somewhat smaller than alignment plate 58. Support plate 60 is disposed on outer surface 70 of plate 58, and gives alignment plate assembly 56 a stepped construction. Support plate 60 is integral with alignment plate 58. Although support plate 60 and alignment plate 58 could be constructed as a single unit, it is preferable that they be two separate pieces rigidly preconnected to each other by welding or similar means, prior to assembly of beam pivot connection 11. Support plate 60 has central cylindrical opening 62 through its surface of sufficient diameter to accommodate inner tube 42 of beam assembly 18. Like cross-dimension of slot 61, diameter of opening 62 is smaller than width of apertures 50 and 52 of bracket 22. Opening 62 is positioned so as to be in alignment with slot 61.

Assembly of the component parts of beam pivot connection 11 is now discussed with reference to FIGS. 2-5. Washers 54 are first slip fit over end portions of inner tube 42 of beam assembly 18, so that ends 43 of tube 42 project through central openings 55. End portion 34 of beam assembly 18, containing integral bushing 33, is then inserted into bracket 22, so that outwardly extending ends 43 of inner tube 42 pass into and through apertures 50 and 52 to a point where top of apertures 50 and 52 are engaged by and are in surface contact with tube 42. In this position washers 54, as shown in FIG. 4, are disposed between beam assembly 18 and abut inner surface of side portions 30 and 32 of bracket 22, with a slight space 47 between beam assembly 18 and washers 54. With ends 43 of inner tube 42 in apertures 50 and 52, and projecting outwardly from side portions 30 and 32 of bracket 22, cylindrical openings of alignment plate assemblies 56, which already preferably have alignment plates 58 welded to support plates 60, are slip fit over ends of inner tube 42. Alignment assemblies 56 are then moved along inner tube 42, away from ends 43, until the inner surface 68 of alignment plate 58 engages side portions 30 and 32 of bracket 22, and bottom edge portion 76 of assembly 56 rests on stops 48. Ends 43 of inner tube 42 are then welded to alignment plates 56. Stops 48 can be optionally provided with a longitudinal channel (not shown), disposed in close relation to side portions 30 and 32 of bracket 22. The longitudinal channel is of a sufficient width and depth to engage bottom edge portion 76 of alignment assembly 56, to allow assembly 56 to be moved longitudinally along channel, and to prevent transverse movement of assembly 56 along stops 48.

Alternatively, it may be preferable for beam pivot connection 11 to be partially preassembled prior to shipping to a customer, so that the customer need only align axle 14 and weld alignment plate assemblies 56 to side portions 30 and 32 of bracket 22. This is accomplished by passing washers 54 over ends 43 of inner tube 42, then passing alignment plate assemblies 56 (having support plates 60 already welded to alignment plates 58) over ends 43 of inner tube 42. Inner tube 42 is then welded around its circumference to support plate 60. End portion 34 of beam assembly 18, containing partially assembled beam pivot connection 11, is then inserted into bracket 22, so that outwardly extending ends 43 of inner tube 42 pass into and through apertures 50 and 52 to a point where tops of apertures 50 and 52 are engaged by and are in surface contact with inner tube 42.

Whether beam pivot connection has been partially preassembled or not, beam assembly 18, with ends 43 of inner tube 42 projecting through and welded to alignment plate assembly 56, and bottom edge portion 76 of alignment assembly 56 resting on stops 48, is moved fore or aft, within apertures 50 and 52 of bracket 22 on either side until proper axle alignment is achieved. This movement, of inner tube 42 of beam assembly 18 within apertures 50 and 52, to achieve proper axle alignment, is possible because, as previously stated, width of apertures 50 and 52 is somewhat greater than diameter of inner tube 42.

Once beam assembly 18 has been moved within apertures 50 and 52 to a point where proper axle alignment has been achieved, alignment plate 58 of alignment plate assembly 56, with its inner surface 68 disposed against outer surface of bracket 22, is welded to frame bracket 22 along top edge portion 66 and side edge portions 64. If support plates 60 have not been previously welded, or if they have and a strengthening of the initial weld is desired along their top and side edges, they are then welded to alignment plates 58, to complete the pivotal connection between beam assembly 18 and frame bracket 22. In this manner, a beam pivot connection is achieved without the use of manually releasable fasteners.

Figure 5:
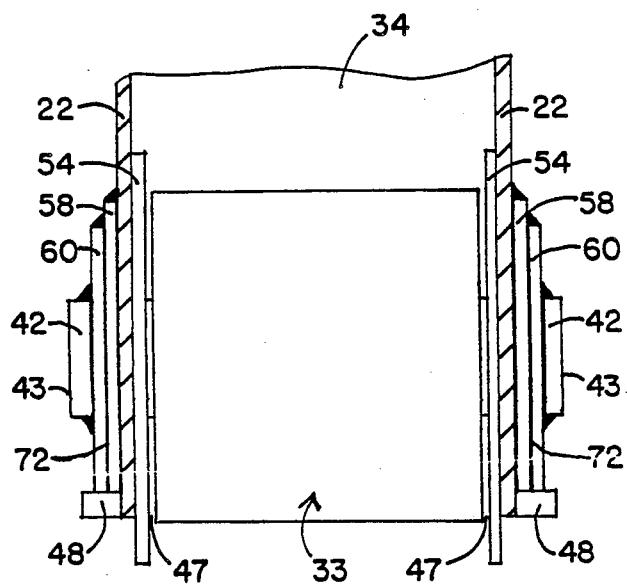
FIG. 5 is a front plan view of an embodiment of the present invention.

The operation of beam pivot connection 11 is now discussed in more, detail with reference to FIGS. 1, 4 and 5. Since axle 14 is rigidly connected to beam assembly 18, forces are translated along beam 18 to area of pivot connection 11 as ground-engaging wheels of vehicle move over terrain. As previously discussed, deflections of beam assembly 18, caused by articulation forces both vertical and non-vertical encountered during operation, are passed through elastomeric device 44 of integral resilient bushing 33. All pivotal or nonsliding rotational movement is designed to be taken up within elastomeric device 44 of bushing 33. In this manner, a rigid connection is provided between inner tube 42, of beam assembly 18, and frame bracket 22.

Once pivot connection 11 is assembled, it can be subsequently disassembled and readjusted if a change in axle alignment is required. This readjustment is accomplished without having to break the welds between support plate 60 and inner tube 42, or between support plates 60 and alignment plates 58. The adjustment of axle alignment is simply achieved by breaking only the welds between alignment plates 58 and bracket 22, to free beam pivot connection 11. With inner tube 42 of beam assembly 18 still within and connected to the edge of opening 62 of support plate 60, beam assembly 18 can be moved fore or aft, resulting in movement of alignment plate assembly 56 along stops 48 on either side of bracket 22, until proper adjustment is achieved. Again, once axle alignment is properly adjusted, alignment plates 58 are welded to bracket 22, and to reconnect beam pivot connection 11.

As previously discussed, beam pivot connection 11 of the present invention is designed to be used in conjunction with beam assembly 18, having an integral resilient bushing 33. Servicing of the brakes or axle of a vehicle having integral bushing 33 may require removal of beam assembly 18 having integral bushing 33. Also, although bushings 33 in many cases do not need to be replaced over the useful life of a vehicle, depending upon the extent to which a vehicle is used and the type of resilient bushing in the beam, they may need to be rebushed one or more times during the life of the vehicle. Beam pivot connection 11 of the present invention also provides a unique mechanism for rebushing of integral resilient bushing 33, while, at the same time providing a means for insuring the same axle alignment after rebushing as was present before rebushing.

In order to rebush resilient bushing 33, support plate 60 is utilized as a sacrificial plate. A longitudinal cut is made to remove support plate 60 from alignment plate 58 and cut-off end 43 of inner tube 42. As previously described, apertures 50 and 52, and slots 61 of alignment plates 58, are open at their bottoms and not entirely closed. Therefore, once support plate 60 is removed, remainder of inner tube 42 can be passed through openings at apertures 50 and 52, and slots 61, to allow simple removal of beam assembly 18 from bracket 22, in order to rebush beam 18. Once rebushing is complete, ends 43 of inner tube 42 are moved back into apertures 50 and 52 and slots 61. Support plates 60 are then passed over inner tube 42, so that ends 43 project through openings 62 of plates 60. Plates 60 are then moved toward alignment plates 58 until they abut outer surface of alignment plates 58. Support plates 60 of inner tube 42 are then welded to ends 43 of inner tube 42, and then to alignment plates 58, to complete beam pivot connection 11 after rebushing. Since alignment plates 58 remain welded to sides 30 and 32 of bracket 22 during the rebushing process, and slots 61 have the same cross-dimension as the diameter of support plates 60, inner tube 42 automatically ends up in the same position as it was prior to rebushing. Therefore the same axle alignment that originally existed is maintained by beam pivot connection 11, after beam assembly 18 has been rebushed.

Once given the above disclosure, many other features, modifications and improvements will become apparent to the skilled artisan. Such features, modifications and improvements are, therefore, considered to be a part of this invention, the scope of which is to be determined by the following claims.

I claim:

1. In a beam-type axle suspension system for a frame membered wheeled vehicle, said suspension system comprising an elongated, longitudinally extending beam connected at one end to a hanger bracket by way of a resilient bushing means, said hanger bracket being connected to said frame member of said wheeled vehicle, and wherein said hanger bracket is comprised of two laterally spaced and opposing side walls, spring means located at the opposite end of said elongated beam from said resilient bushing means and further connecting said elongated beam to the frame member of the wheeled vehicle, means for connecting an axle to the beam located intermediate the ends of the beam, the improvement comprising:

means for aligning the axle of said system with respect to said wheeled vehicle, said aligning means comprising an elongated open-ended aperture located within each of said laterally spaced side walls of said hanger bracket, said resilient bushing means comprising a tubular member extending through a resilient bushing, said resilient bushing being located between the spaced side walls of said hanger bracket, and said tubular member extending between, through and past the peripheral edges of the side walls of said hanger bracket and being located in said open-ended apertures, said tubular member having a diameter less than the width of said open-ended aperture so as to be longitudinally and laterally movable within said aperture, thereby to allow said tubular member to be slidably placed in or removed from said apertures and movable within said apertures a sufficient distance to allow said axle to be aligned with respect to said vehicle, a first plate having an open-ended aperture therewithin and being of a width only slightly greater than the diameter of said tubular member and less than the width of said open-ended apertures in said side walls of said hanger bracket, and a second plate having a closed-ended orifice therewithin having a diameter only slightly greater than the diameter of said tubular member, said first plate being connected to the outer surface of a spaced side wall of said hanger bracket and said second plate being connected to said first plate such tht said first plate is located between said side wall and said second plate, said tubular member extending through and beyond said first and second plate and being connected to said second plate.

2. In the beam-type axle suspension system according to claim 1 where said side walls of said hanger bracket have projections extending outwardly therefrom on which said first plates reside.

3. In the beam-type axle suspension system according to claim 1 wherein the open-ended apertures in said hanger brackets have their open end in the lowermost portion of said side walls and the open-ended apertures in said first plates have their open end in the lowermost portion of said first plates.

* * * * *